United States Patent
Knobloch (10) Patent No.: US 10,959,364 B2
(45) Date of Patent: Mar. 30, 2021

(54) TILLAGE POINT HAVING VARIABLE GROUND ENGAGING STRUCTURE

(71) Applicant: CNH Industrial America LLC, New Holland, PA (US)

(72) Inventor: Dean A. Knobloch, Tucson, AZ (US)

(73) Assignee: CNH Industrial America LLC, New Holland, PA (US)

(*) Notice: Subject to any disclaimer, the term of this patent is extended or adjusted under 35 U.S.C. 154(b) by 204 days.

(21) Appl. No.: 16/193,918

(22) Filed: Nov. 16, 2018

(65) Prior Publication Data

US 2020/0154625 A1 May 21, 2020

(51) Int. Cl.

| A01B 63/02 | (2006.01) |
|---|---|
| A01B 19/08 | (2006.01) |
| A01B 23/02 | (2006.01) |
| A01B 23/04 | (2006.01) |
| A01B 23/06 | (2006.01) |
| A01B 63/00 | (2006.01) |
| A01B 63/10 | (2006.01) |

(52) U.S. Cl.
CPC .......... *A01B 63/023* (2013.01); *A01B 19/08* (2013.01); *A01B 23/02* (2013.01); *A01B 23/043* (2013.01); *A01B 23/06* (2013.01); *A01B 63/004* (2013.01); *A01B 63/10* (2013.01)

(58) Field of Classification Search
CPC ..... A01B 63/008; A01B 63/10; A01B 63/111; A01B 13/08
USPC ....................................................... 172/661
See application file for complete search history.

(56) References Cited

U.S. PATENT DOCUMENTS

| 642,510 A | * | 1/1900 | Tuttle et al. ........... | A01B 35/22 |
|---|---|---|---|---|
| | | | | 172/268 |
| 7,658,234 B2 | | 2/2010 | Brandt et al. | |
| 8,083,004 B2 | | 12/2011 | Knight, Jr. | |

(Continued)

FOREIGN PATENT DOCUMENTS

| CN | 206596348 | 10/2017 |
|---|---|---|
| DE | 19652643 | 6/1998 |

(Continued)

OTHER PUBLICATIONS

Farming Ahead; "Ausplow Deep Tillage Units"; Magazine; Aug. 1, 1996; 3 pages; No. 56; http://www.farmingahead.com/au/wp-content/uploads/2016/10/FA56-31.pdf.

(Continued)

*Primary Examiner* — Taro Mayo-Pinnock
(74) *Attorney, Agent, or Firm* — Rebecca L. Henkel; Rickard K. DeMille (57) ABSTRACT

The present invention provides a tillage point having a ground engaging structure configured to adjust with respect to the ground so that the tillage point can flexibly adapt to various field conditions. The ground engaging structure can comprise wings for increasing soil fracture below the ground surface and/or a cover board for moving soil along the ground surface. The ground engaging structure can variably adjust using an actuator, such as a hydraulic cylinder, connected to linkage which can move the ground engaging structure through multiple angles about a pivot point during tillage operations. In addition, a controller can adjust the actuator to maintain an angle of the ground engaging structure according to a location on a prescription map.

20 Claims, 5 Drawing Sheets

(56) References Cited

U.S. PATENT DOCUMENTS

| | | | |
|---|---|---|---|
| 8,087,471 B2 | 1/2012 | Kovach et al. | |
| 8,548,689 B2 | 10/2013 | Banerjee et al. | |
| 8,626,401 B2 | 1/2014 | Tomich | |
| 9,033,062 B2 | 5/2015 | Stratton et al. | |
| 2013/0092405 A1 | 4/2013 | Hall | |
| 2015/0378362 A1 | 12/2015 | Hulin | |
| 2017/0107700 A1 | 4/2017 | Faivre et al. | |
| 2017/0204588 A1 | 7/2017 | Faivre et al. | |
| 2017/0328029 A1 | 11/2017 | Tsuji et al. | |
| 2018/0228074 A1* | 8/2018 | Tomich | A01B 63/102 |
| 2019/0320574 A1* | 10/2019 | Andrejuk et al. | A01B 63/32 |

FOREIGN PATENT DOCUMENTS

| | | |
|---|---|---|
| RU | 177947 | 3/2018 |
| WO | 2003024193 | 3/2003 |

OTHER PUBLICATIONS

NRH Engineering Ltd; "Auto Reset Subsollers"; 34 pages; Jun. 7, 2016; http://www.nrh-engineering.co.uk/nrh-engineering-complete-brochure.pdf.

Erdvark; "Ripper Deep Hydraulic Reset 3-Point—HRR"; Jun. 11, 2018; http://www.erdvark.co.za/products/ripper/ripper-deep-hydraulic-reset-three-point-hrr/.

Jympa; "Subsollers With Hydraulic Safety System"; Jun. 11, 2018; http://jympa.com/en/products/subsollers/hydraulic/hydraulic-subsollers/.

* cited by examiner

FIG. 5

TILLAGE POINT HAVING VARIABLE GROUND ENGAGING STRUCTURE

FIELD OF THE INVENTION

The present invention relates generally to tillage points for agricultural implements, and more particularly, to an improved tillage point having a ground engaging structure extending outwardly in lateral directions with respect to a direction of travel and an actuator and linkage configured to adjust an orientation of the ground engaging structure with respect to the ground during tillage operations.

BACKGROUND OF THE INVENTION

A wide range of agricultural implements have been developed and are presently in use for tilling, cultivating, harvesting and so forth. Tillage implements, for example, are commonly towed behind tractors and may cover wide swaths of ground which may include various types of residue. Such residue may include materials left in the field after the crop has been harvested. These residues typically include stalks and stubble, leaves and seed pods. Good management of field residues can increase efficiency of irrigation and control of erosion in the field.

Accordingly, tillers may include ground engaging tools, such as shanks and tillage points, configured to condition the soil for improved moisture distribution while reducing soil compaction from such sources as machine traffic, grazing cattle, and standing water. The points are typically replaceable, and various types of points may be mounted on the shanks, depending upon the field conditions and the desired results of the tilling operation. However, adjusting tillage points to accommodate changing requirements of the field or desired results of the tilling operation can be time consuming and burdensome. Therefore, a need exists for an improved system which enables tilling while better accommodating such changing requirements.

SUMMARY OF THE INVENTION

The present invention provides a tillage point having a ground engaging structure configured to adjust with respect to the ground so that the tillage point can flexibly adapt to various field conditions. The ground engaging structure can comprise wings for increasing soil fracture below the ground surface and/or a cover board for moving soil along the ground surface. The ground engaging structure can variably adjust using an actuator, such as a hydraulic cylinder, connected to linkage which can move the ground engaging structure through multiple angles about a pivot point during tillage operations. In addition, a controller can adjust the actuator to maintain an angle of the ground engaging structure according to a location on a prescription map.

Increased yields in an agricultural field can be realized by making adjustments to an implement to provide a different output as it is used across different soil types and conditions within the same field. Such an implementation of precision/prescribed farming increases variability of ground engaging parts, such as tillage points. The body of the point and its orientation can provide initial soil fracture. Wings placed to the side of the point can lift, twist and roll the soil. The amount of lift, twist or roll can be changed by how the point is oriented with respect to the main body of the point. In one aspect, wings of a tillage point are not welded or bolted to the point, but instead become pivotable wings so that their orientation can change. The wings can be mounted on a pivot that is connected to a linkage which, in turn, can be connected to an actuator, such as a hydraulic cylinder. Actuation of the actuator via the linkage can cause the wings to pivot, thereby changing the operational orientation of the wings. Accordingly, an angle of attack of wings on the tillage point can be adjusted to change the soil fracture and residue coverage as a deep till unit is pulled through the ground. For example in lighter/sandier soil, the wing could be oriented to minimize the amount of soil fractured, versus in the same field with denser soil, such as a wet low spot which had standing water during a prior season resulting in deep compaction, the wings could be oriented to maximize soil fracture and soil movement. Adjustment of the actuators can be done manually by tractor operator or electronically prescribed via prior analysis or input from data. This can provide a method to change operation of a winged point without stopping and physically changing one type of tillage point for another. The same principle can be applied with respect to a shank cover board. Thus, the cover board can be adjustable on the go to accomplish the same result or enhance the result of soil fracture. An additional device can be positioned to the rear of the shank so that the orientation can be changed to add to soil fracture and residue coverage.

Specifically then, one aspect of the present invention can provide a tillage point, including: a body configured to engage soil along a direction of travel, the body including: a nose extending from the body; and a ground engaging structure disposed above of the nose, the ground engaging structure extending outwardly from the body in lateral directions with respect to the direction of travel; linkage connected to the ground engaging structure; and an actuator connected to the linkage, the actuator and the linkage being configured to actuate the ground engaging structure to move with respect to a pivot point arranged between the body and the ground engaging structure to adjust an orientation of the ground engaging structure with respect to the ground.

Another aspect of the present invention can provide an agricultural implement, including: a tool framework configured to be towed behind a vehicle in a direction of travel; multiple shanks mounted to the tool framework; and multiple tillage points, each tillage point extending from a respective shank and including: a body configured to engage soil along the direction of travel, the body including: a nose extending from the body; and a ground engaging structure disposed above of the nose, the ground engaging structure extending outwardly from the body in lateral directions with respect to the direction of travel; linkage connected to the ground engaging structure; and an actuator connected to the linkage, the actuator and the linkage being configured to actuate the ground engaging structure to move with respect to a pivot point arranged between the body and the ground engaging structure to adjust an orientation of the ground engaging structure with respect to the ground.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DETAILED DESCRIPTION

Figure 1:
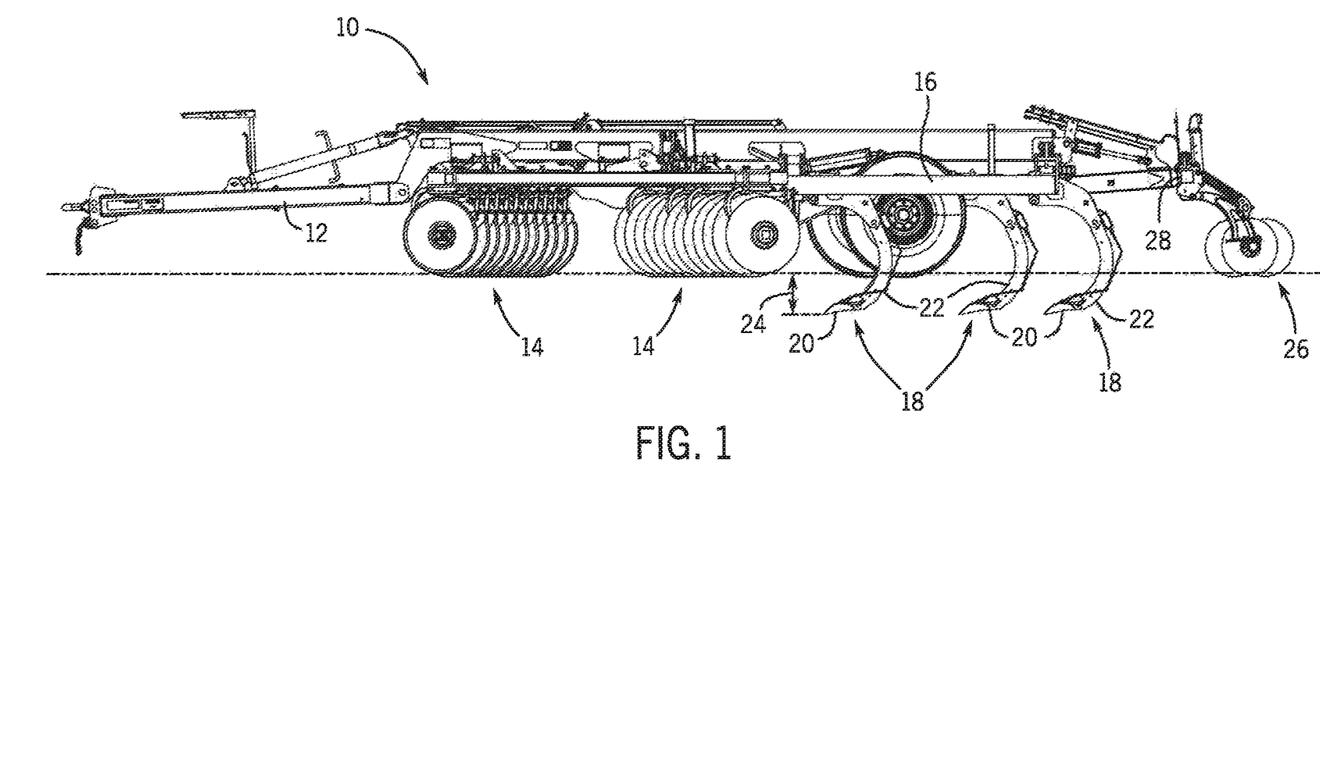
FIG. 1 is a side view of an agricultural implement including tillage points having ground engaging structures configured to adjust in orientation with respect to the ground according to an aspect of the present invention.

Referring now to the drawings and specifically to FIG. 1, an agricultural implement 10 is shown by way of example. The implement 10 may be used to till a field to prepare the soil by plowing, ripping, or turning. A portion of soil residue, such as plant stalks and/or weeds, may be removed during the tilling process. Further, the soil may be loosened and aerated, which in turn facilitates deeper penetration of roots. The tilling process may also help in the growth of microorganisms present in the soil and thus, maintain the fertility of the soil. An exemplar implement could be, for example, an Ecolo-Tiger 875 disk ripper, as available from CNH Industrial, Inc. As depicted, the implement 10 includes a tow bar 12 having a coupling mechanism, such as a hitch, used to couple the implement 10 to a towing vehicle, such as a tractor. The implement 10 also includes disk blades 14 coupled to a frame 16, which supports the blades 14, wheels, and other components of the implement 10. The frame 16 may be formed of a durable, strong material, such as structural steel.

Multiple ground engaging tools 18 are also coupled to the frame 16. In certain aspects, the ground engaging tools 18 may include plows, chisels, hoe openers, harrow tines, tillage points, or any combination thereof, or indeed any desired ground engaging tool. As depicted, the ground engaging tools 18 include tillage points 20 coupled to the frame 16 by shanks 22. The tillage points 20 may be configured to enable variable tilling operations in the field as described herein. In the illustrated embodiment, the ground engaging tools 18 are positioned to till a field at a depth 24. In certain aspects, the depth 24 of the tillage points 20 within the soil may be adjusted by raising or lowering the tools 18. For example, the depth 24 may be particularly adjusted based on local farming practices and/or field conditions. The depth 24 and arrangement of the tools 18 may create valleys and berms which may be smoothed out and leveled off by soil shaping disks 26. Specifically, a row of soil leveling disks 26 is disposed behind the ground engaging tools 18. The soil shaping disks 26 are each coupled to a tool bar 28 that extends from the frame 16. As depicted, the row of soil shaping disks 26 includes multiple disk assemblies disposed at different locations along the tool bar 28. The arrangement and spacing of the individual disk assemblies along the tool bar 28 improves a shape of the soil surface to improve germination while reducing soil compaction.

Figure 2:
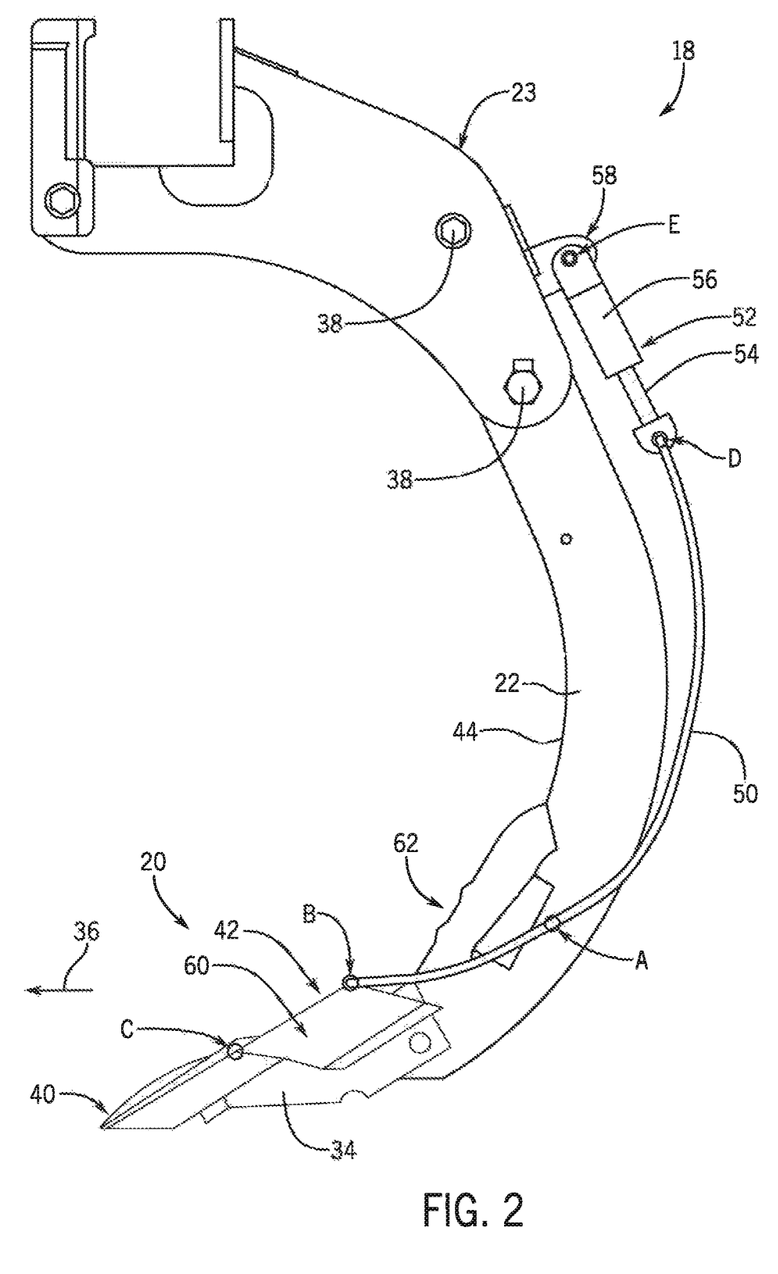
FIG. 2 is a side view of a tillage point in which a ground engaging structure, which comprise wings for increasing soil fracture below the ground surface, is oriented in a first position according to an aspect of the present invention.

Referring now to FIG. 2, a side view of an exemplar tillage point 20 is provided according to an aspect of the present invention. The tillage point 20 can include a body 34 configured to engage soil along a direction of travel 36. The body 34 can extend from a shank 22 coupled to a shank mount 23 by fasteners 38, one or more of which fasteners may be configured to shear upon encountering a resistance exceeding a threshold, such as rocks or tree roots, to protect the system from damage. The body 34 can include a nose 40 extending from the body 34. Configuration of the nose 40 may enable subterranean fracturing of soil at a high-speed operation. The body 34 can also include a ground engaging structure 42 disposed above of the nose 40. Configuration of the ground engaging structure 42 may enable increased fracturing of soil in a wide swath while producing a smooth soil surface. The ground engaging structure 42 extends outwardly from the body 34 in lateral directions with respect to the direction of travel 36. As shown, the ground engaging structure 42 can comprise wings 60 extending from a top surface 44 of the body 34 in opposing directions. The wings 60 can be sloped downward as they extend outward from the body 34, and can be swept rearward with respect to the direction of travel 36, for optimum soil fracturing. In addition, a cover board 62 can be disposed above the wings 60. The cover board 62 can be configured to move soil along the ground surface. The cover board 62 can extend from the top surface 44 of the body 34 in lateral directions with respect to the direction of travel 36. Orientation of the cover board 62 can be made non-adjustable (rigidly fixed, such as bolted or welded).

A linkage 50 can be connected to the ground engaging structure 42, with an actuator 52 connected to the linkage 50, for variably adjusting an orientation of the ground engaging structure 42. In particular, the actuator 52 and the linkage 50 can be configured to actuate the ground engaging structure 42 to move with respect to a pivot point "C," which can comprise a pivot pin and/or fastener, arranged between the body 34 and a lower portion of the ground engaging structure 42 to adjust an orientation of the ground engaging structure 42 with respect to the ground. The actuator 52 can be a hydraulic cylinder having a rod 54 configured to extend and retract from a base 56 to adjust the ground engaging structure 42 in multiple positions. The linkage 50, illustrated as centerline, can be a rigid connective component such as a steel member. A first end of the actuator 52 can be connected to a lug 58 at a mounting point "E" which, in turn, may be attached to the shank mount 23. Also, a second end of the actuator 52 can be connected to the linkage 50 at a pivot point "D," which can comprise another pivot pin and/or fastener.

In operation, extension and retraction of the actuator 52 can cause the linkage 50 to pivot at a pivot point "A" on the shank 22, which can comprise another pivot pin and/or fastener. This, in turn, can cause the linkage 50 to move the ground engaging structure 42 up and down at a pivot point "B," which can comprise another pivot pin and/or fastener, located at an upper portion of the ground engaging structure. Such movement results in pivoting of the ground engaging structure 42 at the pivot point C located at the lower portion or leading edge of the ground engaging structure 42. In other words, pivoting on the upper portion of the ground engaging structure 42 by the linkage 50 causes pivoting of the ground engaging structure 42 at a lower portion thereof about the pivot point C. As illustrated, the rod 54 is extended with respect to the base 56, putting the ground engaging structure 42 in a flattened base position in which it is fully seated with respect to the body 34. However, with additional reference to FIG. 3, in which like reference numerals refer to like parts throughout, the rod 54 can be retracted with respect to the base 56, putting the ground engaging structure 42 in an angled position in which it is lowered (angled) downward from the body 34 normal to the direction of travel 36.

Figure 3:
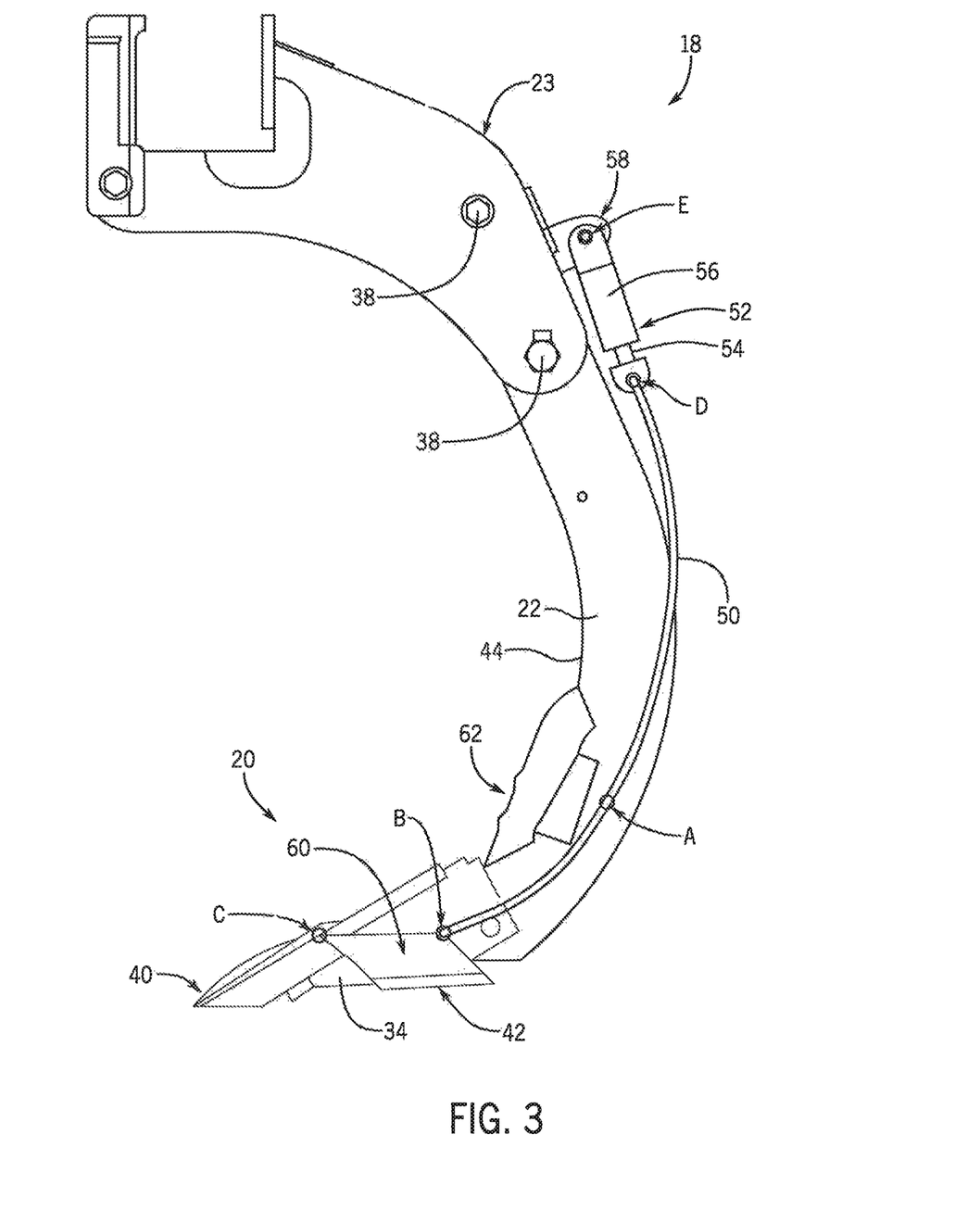
FIG. 3 is a side view of the tillage point of FIG. 2 in which the ground engaging structure is actuated to a second position according to an aspect of the present invention.

Accordingly, the ground engaging structure 42 can variably adjust using the actuator 52 connected to the linkage 50 to move the ground engaging structure 42 through multiple angles about the pivot point C during tillage operations. In addition, a controller, which could be on the implement 10 or the tow vehicle, can adjust the actuator 52 to maintain an angle of the ground engaging structure 42 according to a location, which may be determined by a Global Positioning System (GPS), on a prescription map stored in a data structure.

Figure 4:
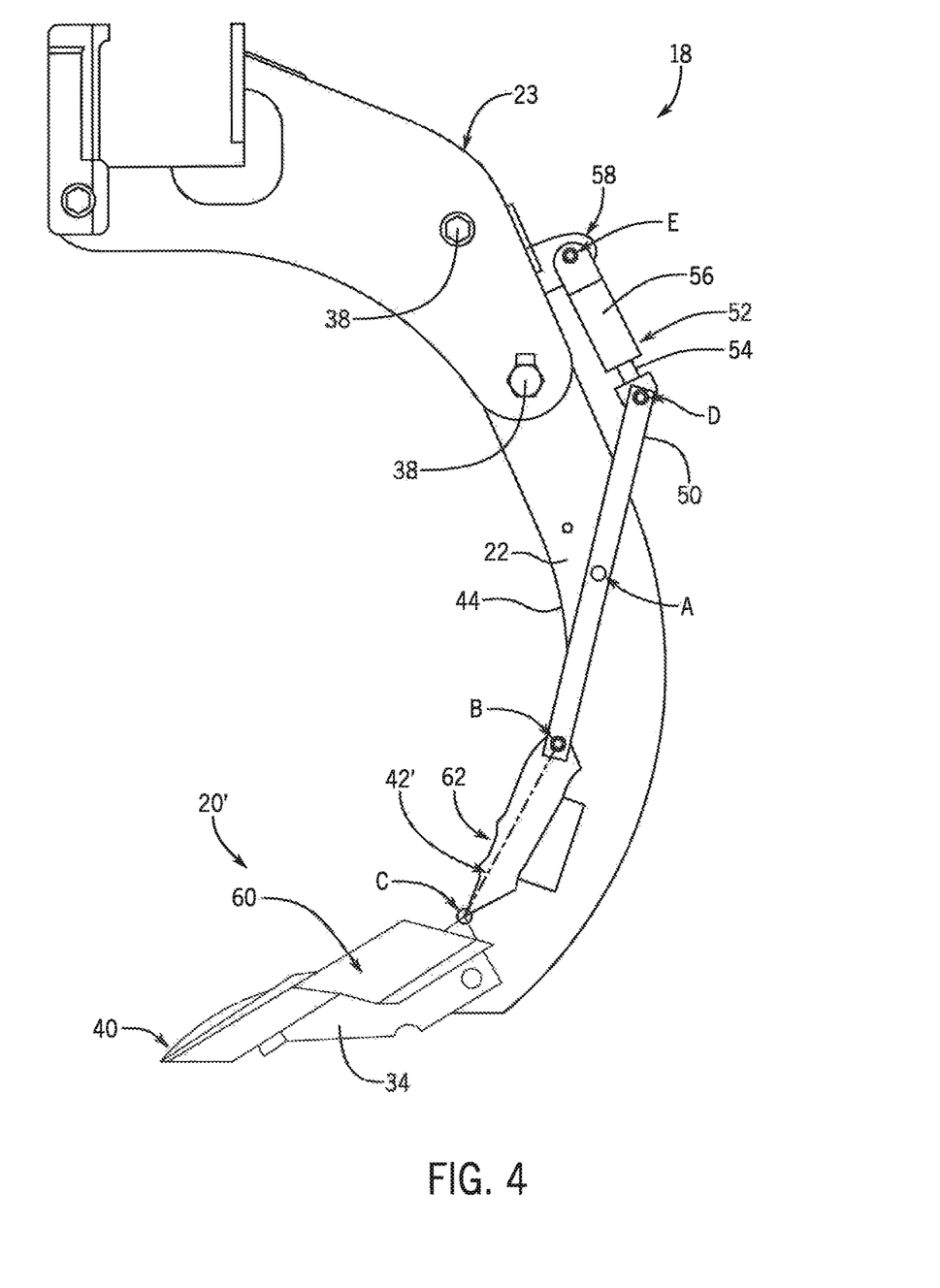
FIG. 4 is a side view of an alternative tillage point in which a ground engaging structure, which comprises a cover board for moving soil along the ground surface, is oriented in a first position according to an aspect of the present invention.

Referring now to FIG. 4, in which like reference numerals refer to like parts throughout, in an alternative aspect, a side view of an exemplar tillage point 20' is provided according to an aspect of the present invention. The tillage point 20' can include a body 34 configured to engage soil along a direction of travel 36. The body 34 can extend from a shank 22 coupled to a shank mount 23 by fasteners 38, one or more of which fasteners may be configured to shear upon encountering a resistance exceeding a threshold, such as rocks or tree roots, to protect the system from damage. The body 34 can include a nose 40 extending from the body 34. Configuration of the nose 40 may enable subterranean fracturing of soil at a high-speed operation. The body 34 can also include a ground engaging structure 42' disposed above of the nose 40. Configuration of the ground engaging structure 42' may enable increased fracturing of soil in a wide swath while producing a smooth soil surface. The ground engaging structure 42' extends outwardly from the body 34 in lateral directions with respect to the direction of travel 36. As shown, the ground engaging structure 42' can comprise a cover board 62 extending from a top surface 44 of the body 34 in opposing directions. The cover board 62 can be configured to move soil along the ground surface. The cover board 62 can be sloped downward as it extends outward from the body 34, and can be swept rearward with respect to the direction of travel 36, for optimum soil spreading. In addition, wings 60 can be disposed below the cover board 62. The wings 60 can be configured to increase soil fracture below the ground surface. The wings 60 can extend from the top surface 44 of the body 34 in lateral directions with respect to the direction of travel 36. Orientation. of the wings 60 can be made non-adjustable (rigidly fixed, such as bolted or welded).

A linkage 50 can be connected to the ground engaging structure 42', with an actuator 52 connected to the linkage 50, for variably adjusting an orientation of the ground engaging structure 42'. In particular, the actuator 52 and the linkage 50 can be configured to actuate the ground engaging structure 42' to move with respect to a pivot point "C, which can comprise a pivot pin and/or fastener, arranged between the body 34 and a lower portion of the ground engaging structure 42' to adjust an orientation of the ground engaging structure 42' with respect to the ground. The actuator 52 can be a hydraulic cylinder having a rod 54 configured to extend and retract from a base 56 to adjust the ground engaging structure 42' in multiple positions. The linkage 50 can be a rigid connective component such as a steel member. A first end of the actuator 52 can be connected to a lug 58 at a mounting point "E" which, in turn, may be attached to the shank mount 23. Also, a second end of the actuator 52 can be connected to the linkage 50 at a pivot point "D," which can comprise another pivot pin and/or fastener.

In operation, extension and retraction of the actuator 52 can cause the linkage 50 to pivot at a pivot point "A" on the shank 22, which can comprise another pivot pin and/or fastener. This, in turn, can cause the linkage 50 to move the ground engaging structure 42' up and down (or fore and aft) at a pivot point "B," which can comprise another pivot pin and/or fastener, located at an upper portion of the ground engaging structure. Such movement results in pivoting of the ground engaging structure 42' at the pivot point C located at the lower portion or leading edge of the ground engaging structure 42'. In other words, pivoting on the upper portion of the ground engaging structure 42' by the linkage 50 causes pivoting of the ground engaging structure 42' at a lower portion thereof about the pivot point C. As illustrated, the rod 54 is retracted with respect to the base 56, putting the ground engaging structure 42' in a flattened base position in which it is fully seated with respect to the body 34 (less vertical). However, with additional reference to FIG. 5, in which like reference numerals refer to like parts throughout, the rod 54 can be extended with respect to the base 56, putting the ground engaging structure 42' in an angled position in which it is raised (angled) upward (more vertical) from the body 34 in the direction of travel 36.

Figure 5:
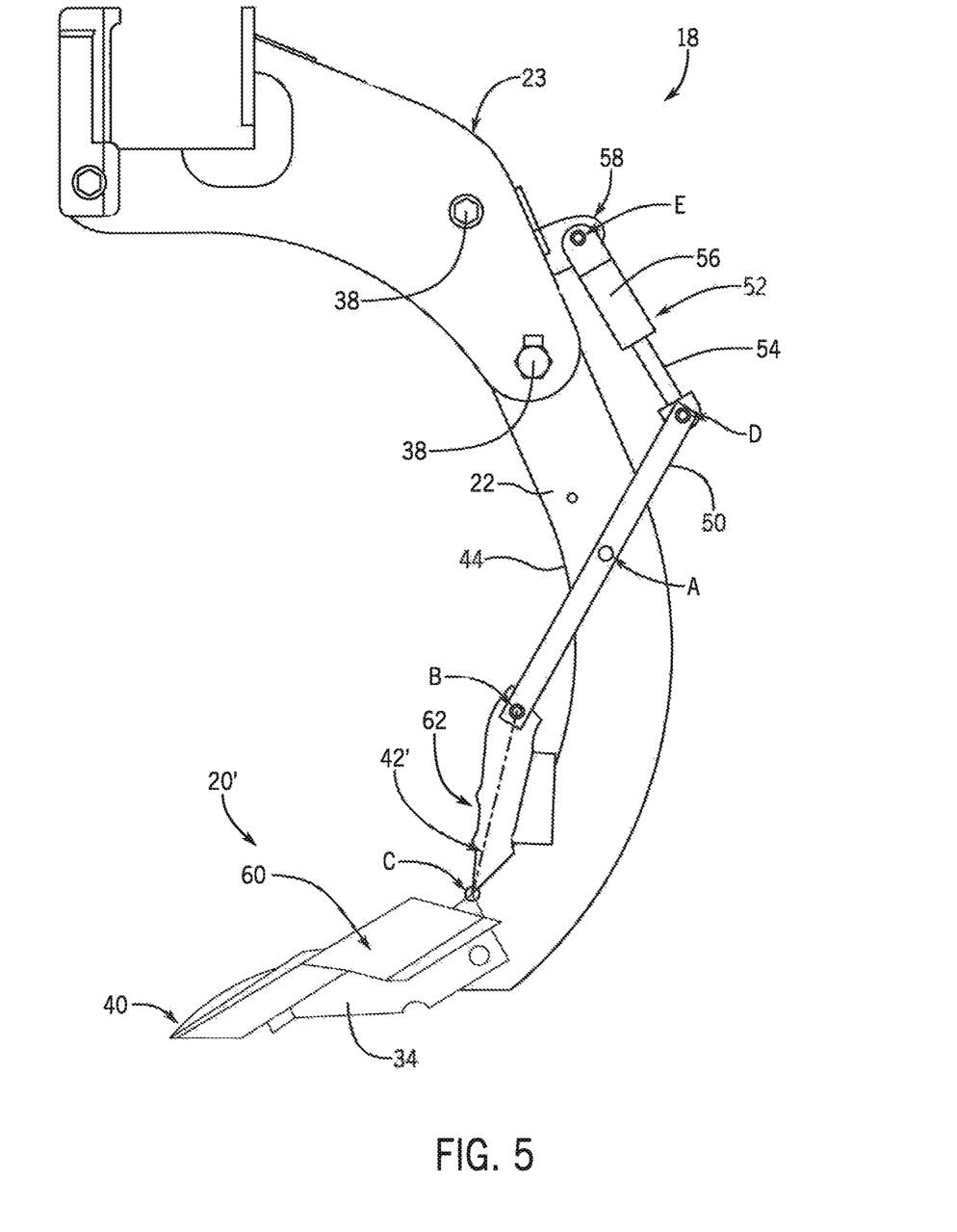
FIG. 5 is a side view of the tillage point of FIG. 4 in which the ground engaging structure is actuated to a second position according to an aspect of the present invention.

Accordingly, the ground engaging structure 42' can variably adjust using the actuator 52 connected to the linkage 50 to move the ground engaging structure 42' through multiple angles about the pivot point C during tillage operations. In addition, a controller, which could be on the implement 10 or the tow vehicle, can adjust the actuator 52 to maintain an angle of the ground engaging structure 42' according to a location, which may be determined by a GPS, on a prescription map stored in a data structure.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A tillage tool, comprising:
   a shank mount including a shank connected at one end thereof;
   a body connected to a free end of the shank and configured to engage soil along a direction of travel;
   a nose connected to and extending from the body in the direction of travel;
   a ground engaging structure disposed above the nose, the ground engaging structure extending outwardly relative to the body in lateral directions with respect to the direction of travel;
   linkage including a plurality of links connected together, more than one link of the plurality of links positioned over a portion of a lateral surface of the shank, the linkage connected to at least one of the body and the ground engaging structure; and
   an actuator connected to the linkage, the actuator and the linkage being configured to actuate the ground engaging structure to move with respect to at least one pivot point positioned on at least one of the body and the ground engaging structure to adjust an orientation of the ground engaging structure with respect to the ground.

2. The tillage tool of claim 1, wherein the actuator is a hydraulic cylinder having a rod configured to extend and retract from a base, wherein the hydraulic cylinder is configured to adjust the ground engaging structure in a plurality of positions.

3. The tillage tool of claim 2, wherein a first end of the hydraulic cylinder is connected to the shank mount, and a second end of the hydraulic cylinder is connected to the linkage.

4. The tillage tool of claim 1, wherein the ground engaging structure comprises wings extending from a top surface of the body, the wings being configured to increase soil fracture below the ground surface.

5. The tillage tool of claim 4, wherein the ground engaging structure includes a cover board disposed above the wings, the cover board configured to move soil along the ground surface, wherein the cover board extends upward from a top surface of the body and from the top surface of the shaft in lateral directions with respect to the direction of travel, and wherein an orientation of the cover board is non-adjustable.

6. The tillage tool of claim 4, wherein the at least one pivot point includes at least a lower pivot point and an upper pivot point, the lower pivot point positioned between the body and a lower portion of the wings and the upper pivot point positioned at an upper edge of the wings, so that an orientation of an upper portion of the wings can be angled with respect to the ground.

7. The tillage tool of claim 1, wherein the ground engaging structure comprises a cover board including a lower end extending upward from a top surface of the body and a front surface of the shaft, the cover board being configured to move soil along the ground surface.

8. The tillage tool of claim 7, wherein the ground engaging structure includes wings positioned below the cover board, the wings being configured to increase soil fracture below the ground surface, wherein the wings extend from the top surface of the body in lateral directions with respect to the direction of travel, and wherein an orientation of the wings is non-adjustable.

9. The tillage tool of claim 7, wherein the at least one pivot point includes at least a lower pivot point and an upper pivot point, the lower pivot point positioned between the body and a lower portion of the cover board and the upper pivot point positioned at an upper edge of the cover board so that an orientation of an upper portion of the cover board can be angled with respect to the ground.

10. The tillage tool of claim 1, further comprising a controller in communication with the actuator, wherein the controller controls the orientation of the ground engaging structure according to a location on a prescription map.

11. An agricultural implement, comprising:
a tillage tool framework configured to be towed behind a vehicle in a direction of travel, including a plurality of tillage tools mounted to the tool framework, each tillage tool of the plurality of tillage tools including
a shank mount configured at one end to mount to the tool framework and including a shank connected to an opposite end thereof;
a body connected to a free end of the shank and configured to engage soil along the direction of travel;
a nose connected to and extending from the body in the direction of travel;
a ground engaging structure disposed above the nose, the ground engaging structure extending outwardly relative to the body in lateral directions with respect to the direction of travel;
linkage including a plurality of links connected together, more than one link of the plurality of links positioned over a portion of a lateral surface of the shank, the linkage connected to at least one of the body and the ground engaging structure; and
an actuator connected to the linkage, the actuator and the linkage being configured to actuate the ground engaging structure to move with respect to at least one pivot point positioned on at least one of the body and the ground engaging structure to adjust an orientation of the ground engaging structure with respect to the ground.

12. The agricultural implement of claim 11, wherein the actuator is a hydraulic cylinder having a rod configured to extend and retract from a base, wherein the hydraulic cylinder is configured to adjust the ground engaging structure in a plurality of positions.

13. The agricultural implement of claim 12, wherein a first end of the hydraulic cylinder is connected to the shank mount, and a second end of the hydraulic cylinder is connected to the linkage.

14. The agricultural implement of claim 11, wherein the ground engaging structure comprises wings extending from a top surface of the body, the wings being configured to increase soil fracture below the ground surface.

15. The agricultural implement of claim 14, wherein the ground engaging structure includes a cover board positioned above the wings, the cover board configured to move soil along the ground surface, wherein the cover board extends upward from the top surface of the body and a front surface of the shaft in lateral directions with respect to the direction of travel, and wherein an orientation of the cover board is non-adjustable.

16. The agricultural implement of claim 14, wherein the at least one pivot point includes at least a lower pivot point and an upper pivot point, the lower pivot point positioned between the body and a lower portion of the wings and the upper pivot point positioned at an upper edge of the wings, so that an orientation of the wings can be angled with respect to the ground.

17. The agricultural implement of claim 11, wherein the ground engaging structure comprises a cover board including a lower end extending from a top surface of the body and a front surface of the shaft, the cover board being configured to move soil along the ground surface.

18. The agricultural implement of claim 17, wherein the ground engaging structure includes wings positioned below the cover board, the wings configured to increase soil fracture below the ground surface, wherein the wings extend from the top surface of the body in lateral directions with respect to the direction of travel, and wherein an orientation of the wings is non-adjustable.

19. The agricultural implement of claim 17, wherein the at least one pivot point includes at least a lower pivot point and an upper pivot point, the lower pivot point positioned between the body and a lower portion of the cover board and the upper pivot point positioned at an upper edge of the cover board, so that an orientation of an upper portion of the cover board can be angled with respect to the ground.

20. The agricultural implement of claim 11, further comprising a controller in communication with the actuator, wherein the controller controls the orientation of the ground engaging structure according to a location on a prescription map.

* * * * *